(12) United States Patent
Akiya et al.

(10) Patent No.: US 9,905,257 B2
(45) Date of Patent: Feb. 27, 2018

(54) HARD DISK DRIVE, MANUFACTURING METHOD OF THE SAME, AND SERVO DATA WRITING METHOD

(71) Applicant: KABUSHIKI KAISHA TOSHIBA, Tokyo (JP)

(72) Inventors: Shinsuke Akiya, Yokohama Kanagawa (JP); Kazuhiko Takaishi, Machida Tokyo (JP); Hideo Sado, Kamakura Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/243,582

(22) Filed: Aug. 22, 2016

(65) Prior Publication Data

US 2017/0221512 A1 Aug. 3, 2017

Related U.S. Application Data

(60) Provisional application No. 62/290,824, filed on Feb. 3, 2016.

(51) Int. Cl.
*G11B 5/09* (2006.01)
*G11B 5/596* (2006.01)

(52) U.S. Cl.
CPC ................ *G11B 5/59655* (2013.01)

(58) Field of Classification Search
None
See application file for complete search history.

(56) References Cited

U.S. PATENT DOCUMENTS

| 6,128,153 | A  | * | 10/2000 | Hasegawa | G11B 5/59627 360/77.04 |
| 6,519,107 | B1 | * | 2/2003  | Ehrlich  | G11B 5/59688 360/75 |
| 6,600,620 | B1 | * | 7/2003  | Krounbi  | G11B 5/59644 360/51 |
| 7,136,242 | B1 | * | 11/2006 | Chue     | G11B 5/5526 360/51 |
| 7,453,661 | B1 | * | 11/2008 | Jang     | G11B 5/59638 360/75 |
| 7,489,464 | B1 | * | 2/2009  | McNab    | G11B 5/4826 360/75 |
| 7,567,403 | B2 |   | 7/2009  | Sacks et al. | |
| 8,031,429 | B2 |   | 10/2011 | Gerasimov | |

(Continued)

FOREIGN PATENT DOCUMENTS

JP 4234530 B2 3/2009

*Primary Examiner* — Peter Vincent Agustin
(74) *Attorney, Agent, or Firm* — Patterson & Sheridan, LLP

(57) ABSTRACT

A method for writing servo data includes writing servo data as a head moves outward on a disk one step at a time, so as to overwrite part of servo data that have been written in a previous step, writing servo data as the head moves inward on the disk one step at a time, so as to overwrite part of servo data that have been written in a previous step, and writing one of two-phase burst data, or address data and the other of said two-phase burst data, at the radial position, so as to overwrite at least part of servo data written in each last step of the writings as the head moves outward and inward. The same address data are written in two consecutive steps as the head moves outward and as the head moves inward.

10 Claims, 16 Drawing Sheets

(56) References Cited

U.S. PATENT DOCUMENTS

| | | |
|---|---|---|
| 8,559,128 B2 | 10/2013 | Suzuki |
| 2004/0125491 A1* | 7/2004 | Iseri .................. G11B 21/106 360/75 |
| 2006/0007588 A1* | 1/2006 | Oki .................. G11B 5/59666 360/75 |
| 2007/0159711 A1* | 7/2007 | Dunn ................ G11B 5/59666 360/75 |
| 2007/0253094 A1* | 11/2007 | Hara ................ G11B 5/59627 360/77.08 |
| 2010/0067142 A1* | 3/2010 | Pokharel ................ B82Y 10/00 360/77.08 |

* cited by examiner

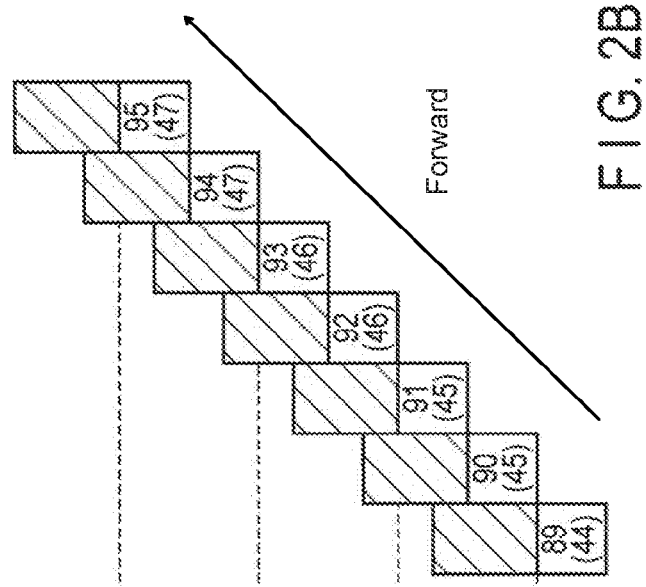
F I G. 2B

| Step mod 4 | Burst A | Burst B |
|---|---|---|
| 3 | Q (180 deg) | N (0 deg) |
| 2 | N (0 deg) | N (0 deg) |
| 1 | N (0 deg) | Q (180 deg) |
| 0 | Q (180 deg) | Q (180 deg) |

(REV)

F I G. 3A

| Step mod 4 | Burst A | Burst B |
|---|---|---|
| 3 | N (0 deg) | N (0 deg) |
| 2 | N (0 deg) | Q (180 deg) |
| 1 | Q (180 deg) | Q (180 deg) |
| 0 | Q (180 deg) | N (0 deg) |

(FWD)

F I G. 3B

| Step mod 4 | Gray | Burst A | Burst B |
|---|---|---|---|
| 3 | write | not write | N (0 deg) |
| 2 | not write | N (0 deg) | not write |
| 1 | write | not write | Q (180 deg) |
| 0 | not write | Q (180 deg) | not write |

F I G. 3C

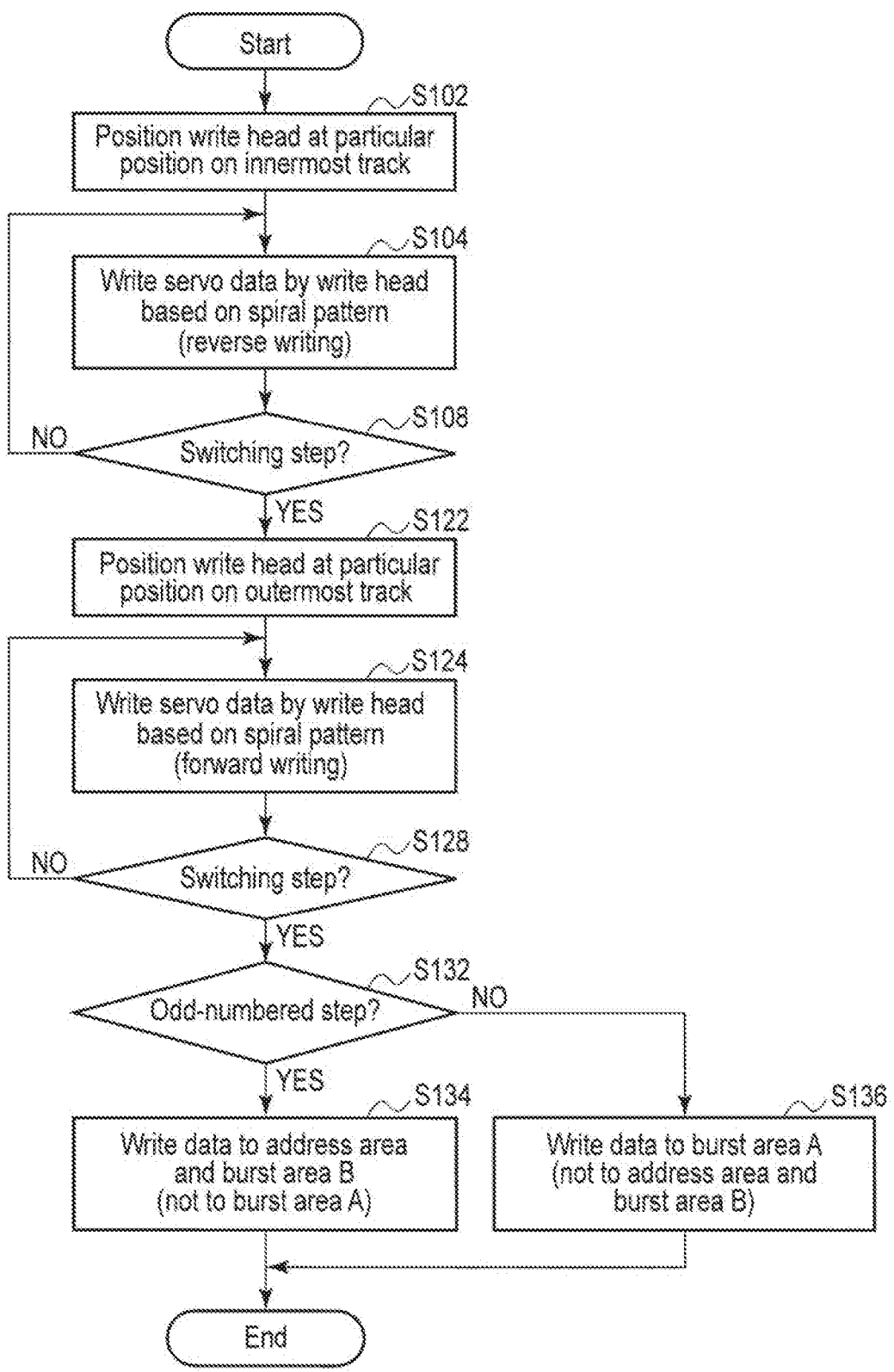
F I G. 5

| Target step | Target sector | Border Len | Sector Len |
|---|---|---|---|
| 1490 | s1 | b1 | L1 |
| 1491 | s2 | b2 | L2 |
| 1492 | s3 | b3 | L3 |
| 1493 | s4 | b4 | L4 |
| 1494 | s5 | b5 | L5 |
| 1495 | s6 | b6 | L6 |
| ... | ... | ... | ... |

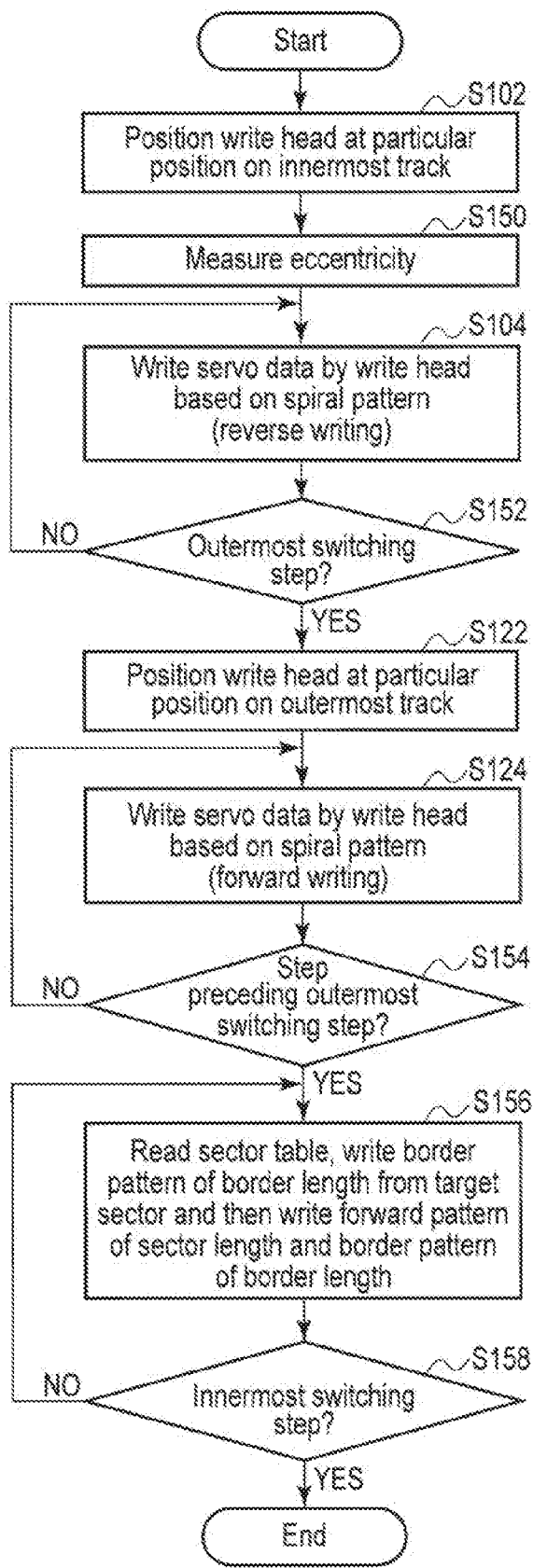
F I G. 11

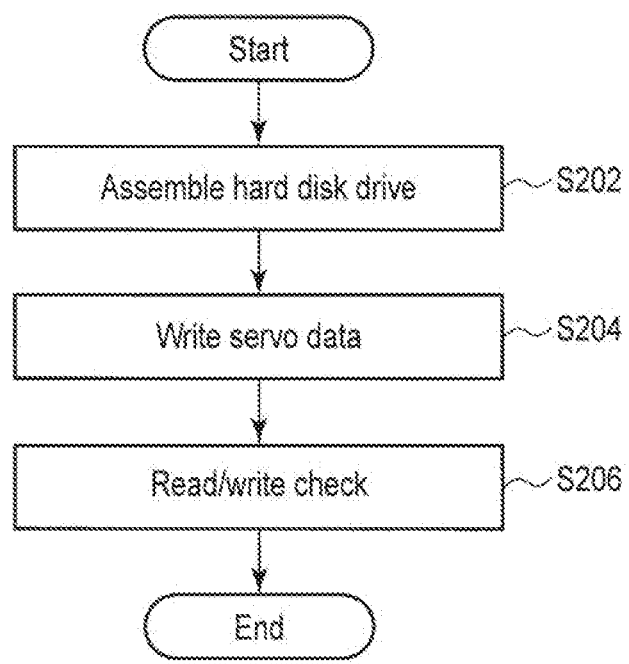
F I G. 12

HARD DISK DRIVE, MANUFACTURING METHOD OF THE SAME, AND SERVO DATA WRITING METHOD

CROSS-REFERENCE TO RELATED APPLICATION

This application is based upon and claims the benefit of priority from Provisional Application No. 62/290,824, filed Feb. 3, 2016, the entire contents of which are incorporated herein by reference.

FIELD

Embodiments described herein relate generally to a hard disk drive (HDD), a manufacturing method of the same, and a servo data writing method.

BACKGROUND

In a hard disk drive, servo data are used to position a magnetic head (hereinafter also referred to as a head) on a target track on a magnetic disk (hereinafter also referred to as a disk). Radial servo areas (servo regions) are provided on the disk, and each of the servo areas includes a plurality of servo tracks. The servo data, which include address and burst data, are written in each of the servo tracks.

The servo data are recorded on the disk through a servo writing process during manufacture of the hard disk drive. The servo writing process includes a self-servo writing process, which is carried out using the head of the hard disk drive after the disk and the head are assembled into the hard disk drive.

After writing one unit of servo data, the head moves a distance less than a track width of the servo track and writes the next unit of servo data so as to overwrite part of the servo data that have been written immediately previously. The remaining part of the servo data becomes a servo track. When the head moves inward on the disk, an inner track side of servo data is overwritten. When the head moves outward on the disk, an outer track side of each servo data is overwritten.

A skew angle (also called a yaw angle) formed by a tangent of a track and a line passing through centers of a write element of the head and a read element of the head is zero at a middle diameter track on the disk. The skew angle increases in a positive direction as the head moves outward, and increases in a negative direction as the head moves inward. If the skew angle is large, quality of the servo data may be degraded because the data are written by a side end of the write head. It is known that the degree of degradation differs according to whether the skew angle is positive or negative and which direction the head moves. That is, if the head writes servo data while moving inward, the quality tends to be degraded more when the skew angle is negative than when the skew angle is positive. When the head writes servo data while moving outward, the quality tends to be degraded more when the skew angle is positive than when the skew angle is negative.

To deal with this issue, a bidirectional writing method of writing servo data is proposed. In tracks located outside of a middle diameter track at which the skew angle is zero, the servo data are written as the head moves inward. In tracks located inside the middle diameter track, the servo data are written as the head moves outward. The degradation of the servo data can be reduced by this bidirectional writing method.

Since the last track at the middle diameter in the bidirectional writing method is not overwritten with another track, a width of the last track is greater than the width of the other tracks, assuming that a width of normal track is smaller than the width of the write element. That is, the width of the last-written track is different from the width of the other tracks, which leads to discontinuity of track pitch. For that reason, the address and the burst data become irregular at the last track and servo control using such servo data may not be performed properly.

BRIEF DESCRIPTION OF THE DRAWINGS

FIG. 2B shows an example of forward writing of addresses.

FIG. 3A shows an example of burst data written to burst areas A and B by reverse writing.

FIG. 3B shows an example of burst data written to burst areas A and B by forward writing.

FIG. 3C shows an example of burst data written to burst areas A and B in the last step of forward writing.

FIG. 5 is a flowchart showing servo data writing according to a first embodiment.

FIG. 11 is a flowchart showing servo data writing according to the fourth embodiment.

FIG. 12 shows a manufacturing method of a hard disk drive according to a fifth embodiment.

DETAILED DESCRIPTION

Various embodiments will be described hereinafter with reference to the accompanying drawings. The drawings and the associated descriptions are provided to illustrate the embodiments and not to limit the scope of the invention.

In general, according to an embodiment, a method for writing servo data including address data and a pair of two-phase burst data, in a disk using a write element of a head includes following processes: (i) writing the servo data as the head moves outward on the disk towards a radial position thereof one step at a time, so as to overwrite part of servo data that have been written in a previous step, wherein the same address data are written as the head moves outward in two consecutive steps; (ii) writing the servo data as the head moves inward on the disk towards the radial position one step at a time, so as to overwrite part of servo data that have been written in a previous step, wherein the same address data are written as the head moves inward in two consecutive steps; and (iii) writing either one of two-phase burst data, or address data and the other of said two-phase burst data, at the radial position, so as to overwrite at least part of servo data written in a last step of the writing as the head moves outward and at least part of servo data written in a last step of the writing as the head moves inward.

First Embodiment

Figure 1:
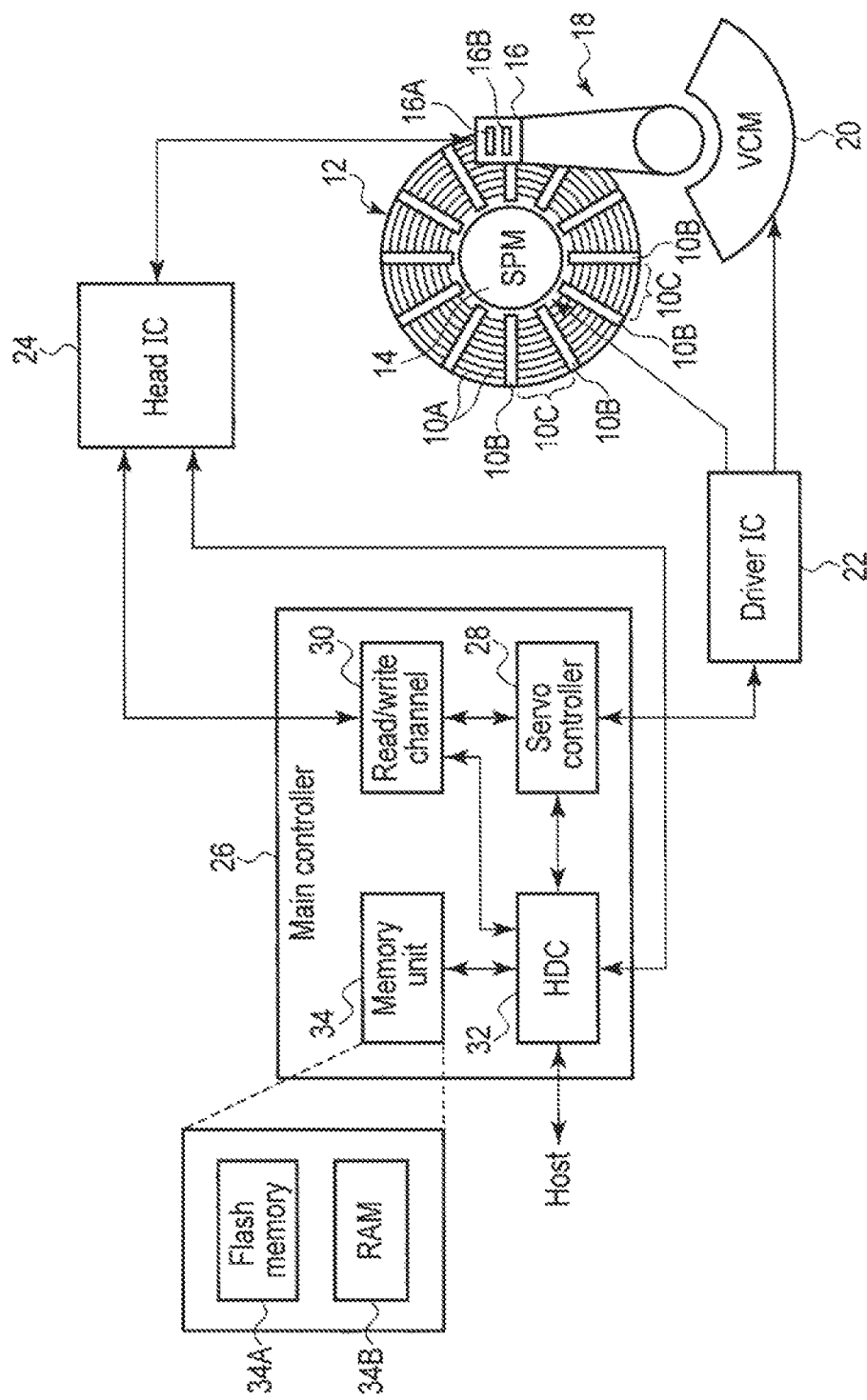
FIG. 1 illustrates a configuration of a hard disk drive according to an embodiment.

FIG. 1 illustrates a configuration of a hard disk drive according to a first embodiment.

A disk 12 is rotated at high speed by a spindle motor (SPM) 14. The SPM 14 is driven by a current or voltage supplied from a driver IC 22. The hard disk drive shown in FIG. 1 has a single disk 12, but several disks may be stacked. A head 16 including a write head (also called a write element) 16A and a read head (also called a read element) 16B is provided at a tip of an arm 18. The head 16 is opposed to the disk 12. The arm 18 is driven by a voice coil motor (VCM) 20 and thereby moves the head 16 in a radial direction of the disk 12 and seeks a target track. The VCM 20 is driven by a current or voltage supplied from the driver IC 22.

When the head 16 is located on a middle track in a diameter direction of the disk 12, the arm 18 is parallel to a tangential direction of the track, and the read head 16B and the write head 16A are located on the same track. Since the write head 16A is located closer to the tip of the arm 18 than the read head 16B, the write head 16A is located inner than the read head 16B when the head 16 is located on tracks inner than the middle track. When the head 16 is located on tracks outer than the middle track, the write head 16A is located outer than the read head 16B. A yaw angle (or skew angle) formed by a tangent of a track and a straight line passing through the centers of the read head 16B and the write head 16A is zero when the head 16 is located on the middle track. The yaw angle increases in a positive direction as the head 16 moves toward the outermost track and increases in a negative direction as the head 16 moves toward the innermost track.

For example, the disk 12 includes concentric data tracks 10A. A single spiral data track may be formed instead of the concentric data tracks 10A. In the case of the spiral track, each circuit can be regarded as a single track and the spiral track can be virtually regarded as concentric tracks.

For example, the disk 12 includes a plurality of radial servo areas 10B evenly spaced apart in a circumferential direction. In the servo areas 10B, servo tracks with a pitch in the radial direction, which is different from (or equal to) a pitch of the data tracks 10A, are formed. An area between adjacent servo areas 10B in the data tracks 10A is a data area 10C. The servo areas 10B are also called servo frames. A group of a servo area 10B and a data area 10C adjacent thereto is also called a servo sector. The data tracks 10A in the data area 10C include data sectors.

Servo data are written to the servo areas 10B. The servo data include a preamble, a sync mark, an address, and burst data. The address includes an address of a servo track (i.e., a cylinder address) and an address of a servo sector. The burst data include a repeatable runout (RRO) error caused by distortion of a track from a perfect circle. RRO correction data for correcting the RRO error may be included in the servo data.

The driver IC 22 drives the spindle motor 14 and the voice coil motor 20 under the control of a servo controller 28 in a main controller 26.

The head IC 24 is also called a head amplifier and includes a variable gain amplifier (VGA) configured to amplify an output signal of the read head 16B of the head 16 by a gain according to the amplitude of the signal. The amplitude of the output of the VGA is substantially constant. The head IC converts write data output from the main controller 26 (more specifically, a read/write channel 30 in the main controller 26) into a write current and outputs the write current to the write head 16A of the head 16.

The main controller 26 is realized by a system LSI obtained by integrating elements on a single chip. The main controller 26 includes the read/write (R/W) channel 30, a hard disk controller (HDC) 32, the servo controller 28, and a memory unit 34. The memory unit 34 includes a flash memory 34A and a RAM 34B. The flash memory 34A is a rewritable semiconductor nonvolatile memory. A control program (firmware) for performing functions of the main controller 26 including the HDC 32 and the servo controller 28 is stored in a part of a memory area of the flash memory 34A. At least a part of a memory area of the RAM 34B is used as a work area for the HDC 32 and the servo controller 28. The memory unit may be integrated on a chip different from the main controller 26.

The read/write channel 30 controls data writing to the disk 12 and data reading from the disk 12 through the head IC 24 and the head 16. For example, the read/write channel 30 converts an output signal of the read head 16B corresponding to the data area 10C and the servo area 10B and amplified by the head IC 24 into digital data and reproduces data written to the data area 10C and the servo area 10B based on the digital data. The read/write channel 30 extracts servo data from the digital data. The read/write channel 30 generates a servo sector timing signal based on the extracted servo data. The servo sector timing signal corresponds to a servo sector including a servo area 10B to which the extracted servo data is written (more specifically, a data area 10C in the servo sector including the servo area 10B). The read/write channel encodes write data transferred from the HDC 32 and transfers the encoded write data to the head IC 24.

The HDC 32 is connected to a host device (not shown) through a host interface (storage interface). The host device uses the hard disk drive as a storage device thereof. The host device and/or the hard disk drive are provided in an electronic device such as a personal computer, a video camera, a music player, a mobile terminal, a cellular phone or a printer. The HDC 32 functions as a host interface controller which transfers a signal to the host and receives a signal from the host. More specifically, the HDC 32 receives a command (write command, read command, etc.) from the host. The HDC 32 controls data transfer between the host and the HDC 32.

The servo controller 28 controls the VCM 20 based on the servo data extracted by the read/write channel 30 in order to position the head 16 on a target track of the disk 12. Controlling the VCM 20 is equivalent to controlling the arm 18 including the VCM 20.

Each of the HDC 32 and the servo controller 28 includes a microprocessor unit (MPU) (not shown). The MPUs perform the functions of the HDC 32 and the servo controller 28 by executing control programs for the HDC 32 and the servo controller 28, respectively. The control programs are stored in the flash memory 34A. A single MPU may execute the control programs by time sharing.

Next, servo data writing is described. In the present embodiment, a self-servo writing process of writing servo data by the HDD is carried out instead of writing servo data to the disk 12 by a servo writer before mounting the disk 12 to a housing of the HDD. As described above, the servo data include the address and burst data. The address is a number different for each servo track, i.e., a servo track number. The address is expressed by a Gray code. The address may be also called a Gray code in the description below. The burst data are a cyclic pattern of a particular cycle used to detect a position gap (position error) of the head from a target position (radial position) in the radial direction. The burst data are separately recorded in two areas, i.e., a burst area A and a burst area B. A phase of burst data written to the burst area A is different by 180 degrees with respect to that of burst data written to the burst area B. A border between the burst area A and the burst area B is a center line of a servo track. Accordingly, when the read head passes the center line of the servo track, the burst data written to the burst area A and the burst data written to the burst area B cancel each other and thus a reproduction signal based on the burst areas A and B is zero. When the read head 16B deviates from the center line of the servo track, the phase and the amplitude of the reproduction signal based on the burst areas A and B differ according to the extent of the deviation and its direction. Therefore, the deviation and its direction can be detected from the phase and the amplitude of the reproduction signal of the burst areas A and B.

Figure 2A:
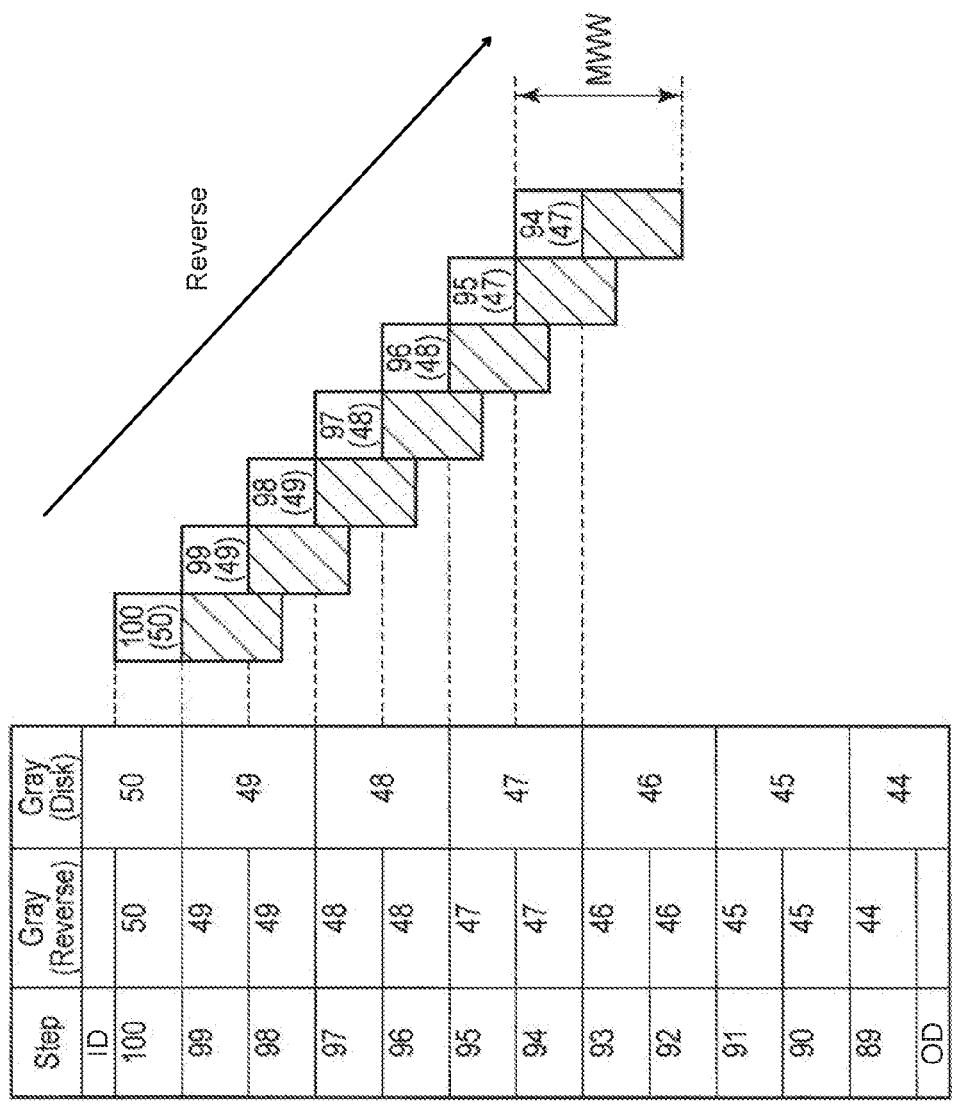
FIG. 2A shows an example of reverse writing of addresses.
Figure 2C:
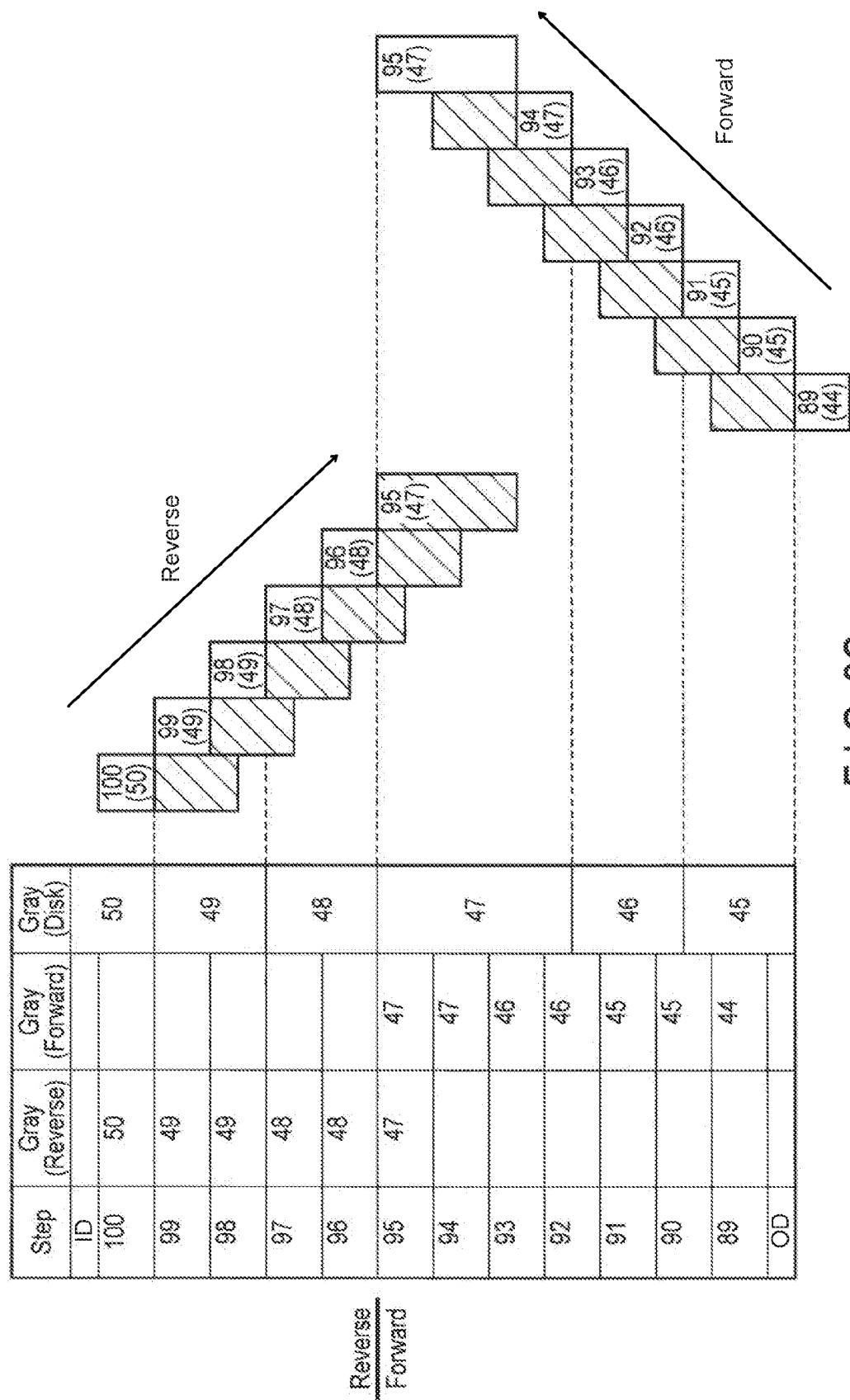
FIG. 2C shows an example of bidirectional writing of addresses.
Figure 2D:
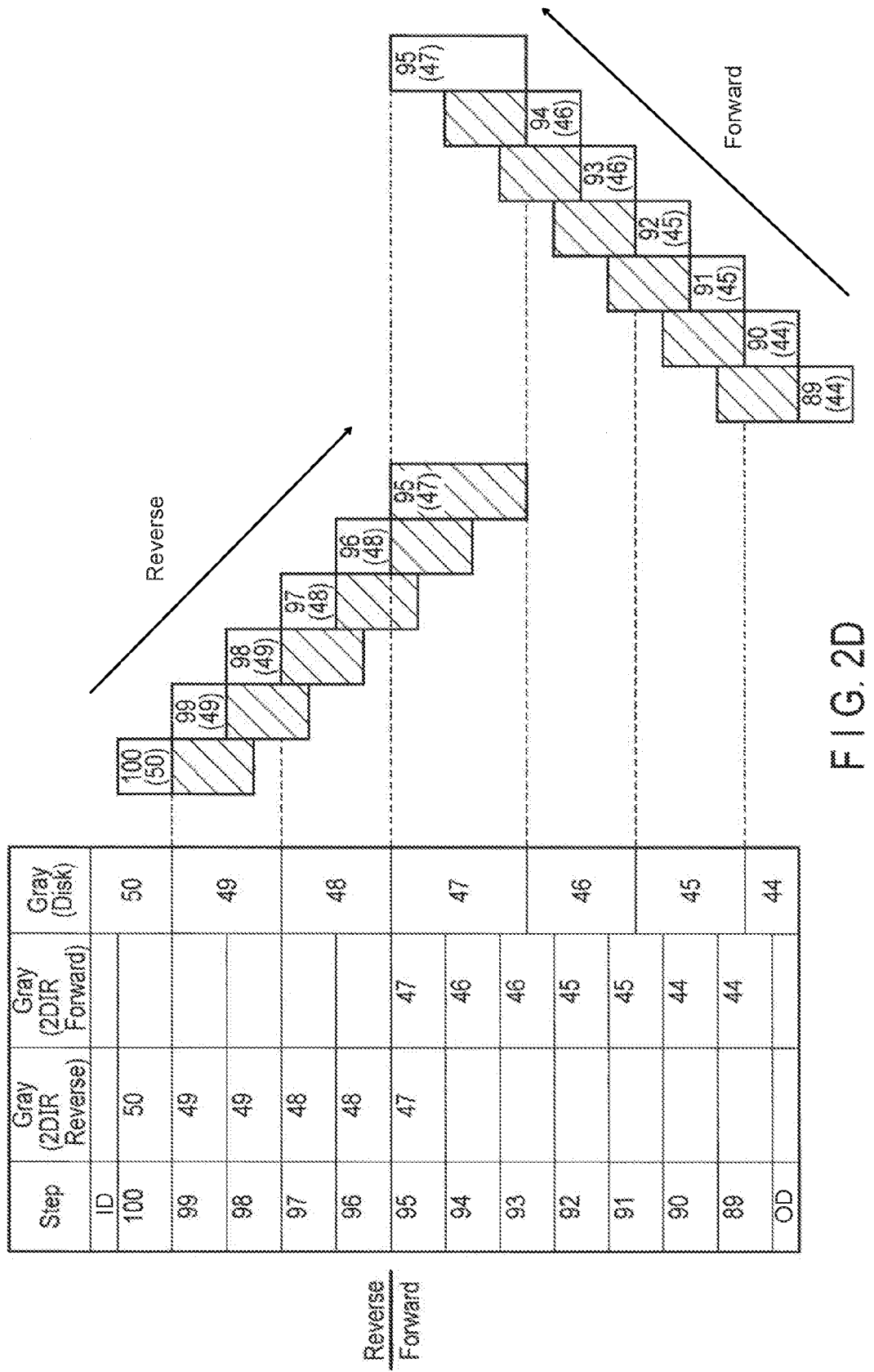
FIG. 2D shows another example of bidirectional writing in which positions of addresses recorded by forward writing are displaced.

In the present embodiment, a preamble and a sync mark constituting servo data are written in a conventional manner, but an address and burst data are written in a manner different from the conventional manner. For convenience of description, address writing is first described. FIG. 2A shows an example of reverse writing of addresses. FIG. 2B shows an example of forward writing of addresses. FIG. 2C shows an example of bidirectional writing of addresses using a combination of the reverse and forward writings shown in FIG. 2A and FIG. 2B. FIG. 2D shows an example of bidirectional writing in the case where positions of addresses recorded by the forward writing are displaced to the inside by one step compared to the bidirectional writing shown in FIG. 2C.

The servo track number is at the maximum in the innermost track and decreases as a track becomes closer to the outermost track. Therefore, writing servo data from an outer diameter track to an inner diameter track (in ascending order of track number) is called forward writing, and writing servo data from the inner diameter track to the outer diameter track (in descending order of track number) is called reverse writing. In the case of the forward writing, a part of servo data on the inner track side of each track is overwritten. In the case of the reverse writing, a part of servo data on the outer track side of each track is overwritten. In the bidirectional writing, reverse writing is performed inside a servo track in which the yaw angle is zero and forward writing is performed outside the servo track in which the yaw angle is zero. Performing reverse writing or forward writing ends at a servo track in which the yaw angle is zero.

In a table on the left side of each of FIG. 2A to FIG. 2D, steps in the left column show radial positions of the write head 16A. In FIG. 2A to FIG. 2D, step 100 is an inner track side and step 89 is an outer track side. The step number is zero in the outermost track and increases toward the innermost track. Two steps correspond to one servo track.

In the table in each of FIG. 2A and FIG. 2B, the center column shows addresses (Gray codes) written by the write head 16A when the end of the write head 16A on the inner track side is located at the radial positions represented by the steps. Since two steps correspond to one servo track, the same address is written in each of the two steps. In FIG. 2A and FIG. 2B, the same address is written in an even-numbered step and an odd-numbered step that is one step larger than the even-numbered step (i.e., one step inside the even-numbered step). That is, the address is obtained by discarding the fractional part of step/2. In the table in each of FIG. 2A and FIG. 2B, the right column shows addresses that remain on the disk after overwriting.

As shown in the right side of FIG. 2A and FIG. 2B, a width MWW of the write head 16A is greater than the width of the addresses on the disk 12 and two and a half times greater than a step width (which is half the track width). Since the write head 16A moves by one step, the write head 16A writes servo data while overwriting an area corresponding to one and a half (=2.5−1) times the step width of an area in which servo data have been written in the previous step. The hatching areas in FIG. 2A and FIG. 2B represent areas overwritten and erased in the next step. In each rectangle expressing the width of the write head 16A, the number in the first line corresponds to a radial position (step), and the parenthesized number in the second line indicates an address written in the step.

As shown in FIG. 2A, since the head 16 moves toward the outermost track in the reverse writing, a part of data on the outer track side of each track is overwritten. As shown in FIG. 2B, since the head 16 moves toward the innermost track in the forward writing, a part of data on the inner track side of each track is overwritten. The same address is written in two steps, but radial positions of addresses written on the disk by the forward writing are displaced outside from radial positions of addresses written by the reverse writing. The displacement is one and a half times the step width.

FIG. 2C shows bidirectional writing in which the write head 16A performs reverse writing as far as step 95 in accordance with the manner shown in FIG. 2A, then moves to the outermost track and performs forward writing as far as step 95 in accordance with the manner shown in FIG. 2B. Since writing positions of addresses on the disk in the reverse writing is displaced from those in the forward writing, the total width of address "47" written in the last step is a combination of the width of address "47" written in step 95 by the forward writing and the width of address "47" written in step 94 by the forward writing and is three and a half times the step width. Since the address width in the other steps is twice the step width, a difference in width is made between the address written in the last step and the addresses written in the other steps in the bidirectional writing. As a result, continuity of pitch is broken near the border between the addresses written by the reverse writing and the addresses written by the forward writing on the disk, which may negatively affect servo control.

According to the present embodiment, as shown in FIG. 2D, radial positions of addresses written on the disk 12 by the forward writing are displaced to the inside by one step in comparison with the radial positions in FIG. 2B and FIG. 2C in the bidirectional writing. As a result, the width of address "47" written in the last step 95 (by forward writing) in the bidirectional writing of FIG. 2D falls within the width NWW of the write head 16A (which is two and a half times the step width) and is substantially equal to the address width of the other steps (which is twice the step width). Therefore, discontinuity of pitch near the border between addresses written by the reverse writing and addresses written by the forward writing shown in FIG. 2C can be suppressed. The continuity of servo tracks can thereby be ensured. In order to displace the writing positions of addresses, as shown in FIG. 2D, the main controller 26 writes the same addresses as FIG. 2A (obtained by discarding the fractional part of step/2) as far as step 95 by the reverse writing, and writes addresses obtained by discarding the fractional part of (step number−1)/2 by the forward writing.

The displacement of the radial positions of addresses written to the disk by the forward writing in FIG. 2D depends on the difference between the radial positions of addresses written by the reverse writing in FIG. 2A and the radial positions of the addresses written by forward writing in FIG. 2B. The reverse writing is first performed in the bidirectional writing, but the order of the reverse writing and the forward writing may be varied arbitrarily, and the forward writing may be performed first. Servo data of a track are written in two steps, but these values may also be changed arbitrarily.

Next, burst data writing is described. As described above, the phase of burst data written to a burst area A is different by 180 degrees with respect to the phase of burst data written to a corresponding burst area B. On the assumption that burst data of 0-degree phase is a first burst N and burst data of 180-degree phase is a second burst Q, there are four combinations of burst data written to burst areas A and B, i.e., (Q, Q), (N, Q), (N, N), and (Q, N). It is preferable that these four combinations are sequentially written. Therefore, combinations of burst data to be written to burst areas A and B are determined based on modulo 4 of step numbers in the present embodiment. Since the write head 16A is wider than the track by half the step width, writing positions of burst data in the reverse writing are displaced from those in the forward writing by one step in the same manner as the addresses. FIG. 3A shows burst data in the case of the reverse writing. FIG. 3B shows burst data in the case of the forward writing.

If the burst data are written by the bidirectional writing in accordance with the manners shown in FIG. 3A and FIG. 3B, continuity of the four combinations of burst data cannot be maintained near the border between the burst data written by the forward writing and the burst data written by the reverse writing. According to the present embodiment, in order to avoid this, the main controller 26 omits writing a Gray code or a part of burst data in the last step of the forward writing depending on whether the step number of the last step is an odd or even number. FIG. 3C shows servo data in the last step of the forward writing based on modulo 4 of the step numbers.

A preamble and a sync mark are written in the same way in the reverse writing and the forward writing regardless of whether a step is the last step of the forward writing. Writing of the Gray code or the burst data of the last step of the forward writing is omitted based on modulo 4 of the step number. If modulo 4 of the step number of the last step of the forward writing is an even number (0 or 2), the burst data are written only to the burst area A, and writing to the address area and the burst area B is omitted. If modulo 4 of the step number of the last step of the forward writing is an odd number (1 or 3), writing to the burst area A is omitted, and the Gray code and the burst data are written to the address area and the burst area B, respectively.

Figure 4A:
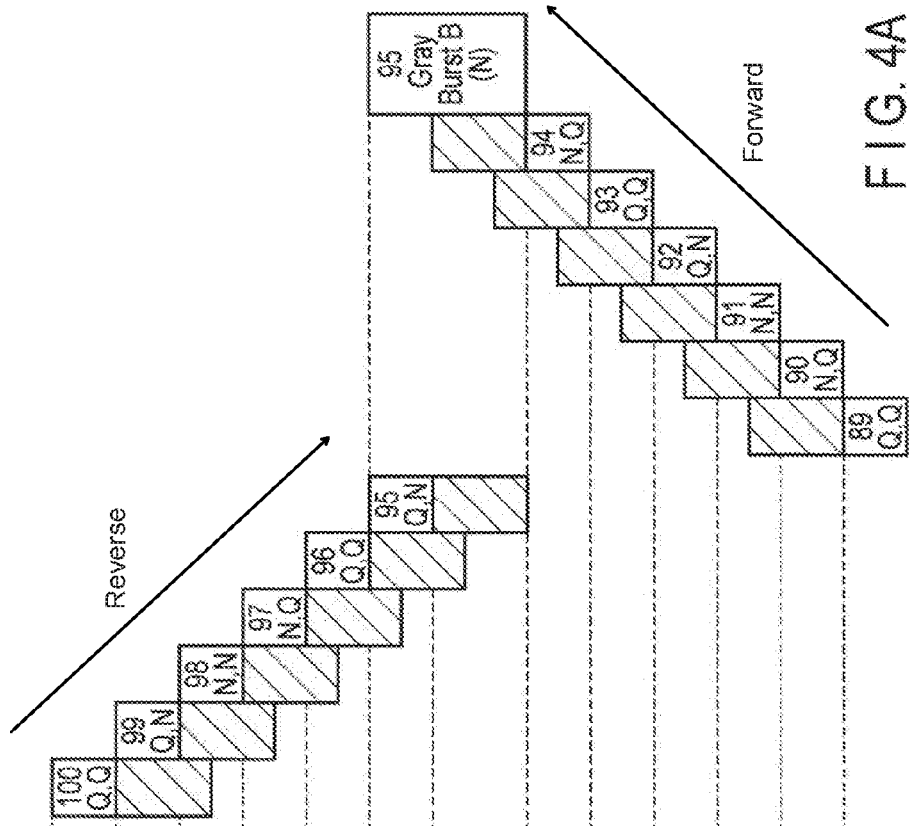
FIG. 4A shows address and burst data in the case where a border between reverse writing and forward writing is an odd-numbered step.
Figure 4B:
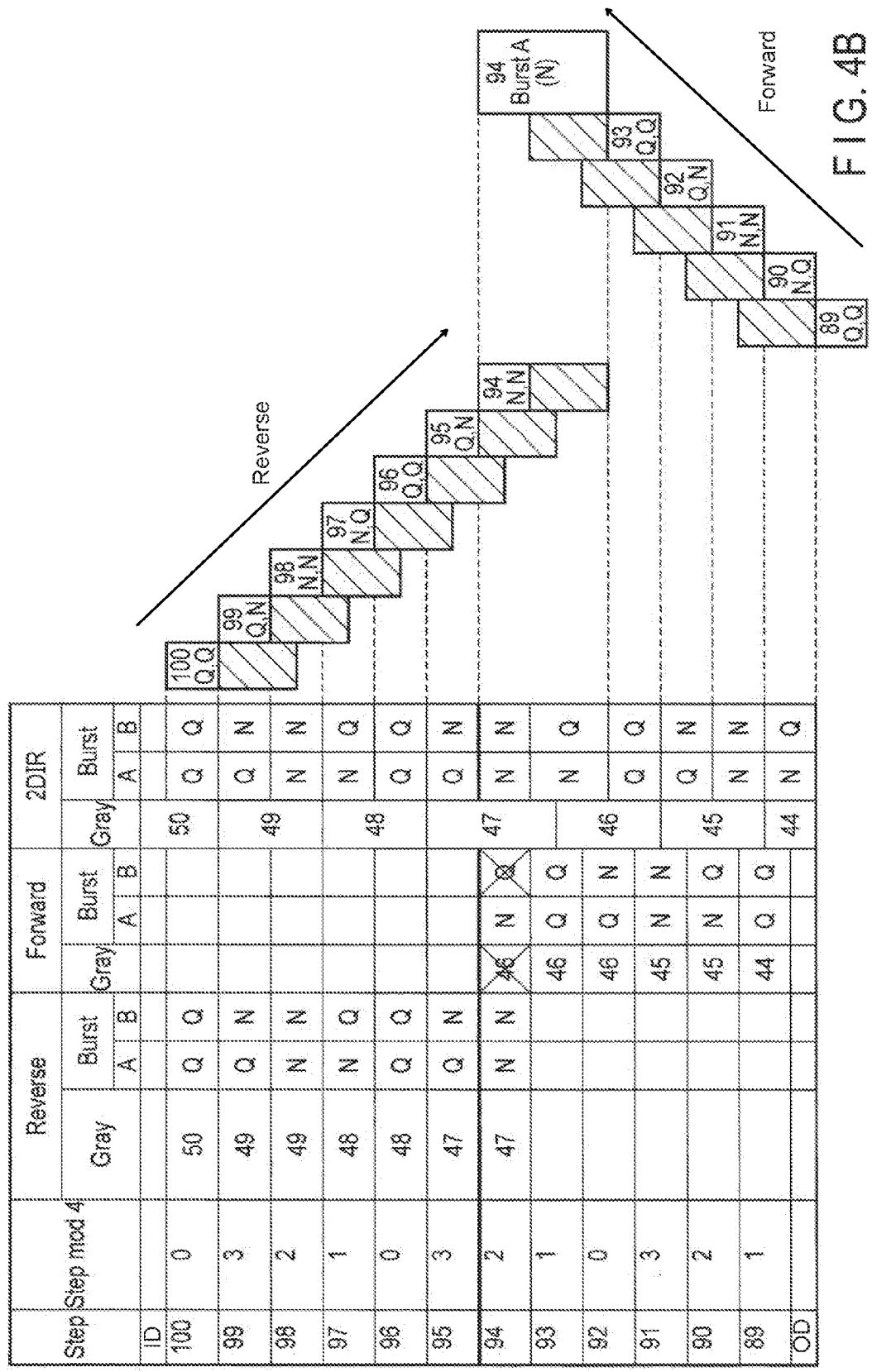
FIG. 4B shows address and burst data in the case where the border between reverse writing and forward writing is an even-numbered step.

FIG. 4A shows burst data in the case where the number of the last step of the forward writing in the bidirectional writing is an odd number (95). FIG. 4B shows burst data in the case where the number of the last step of the forward writing in the bidirectional writing is an even number (94).

The case where the step number of the last step of the forward writing is an odd number is described with reference to FIG. 4A. First, the reverse writing is performed and burst data are written as far as step 95 as shown in the "Reverse" column in FIG. 4A. Burst data "Q, Q" are written in step 100, burst data "Q, N" are written in step 99, burst data "N, N" are written in step 98, burst data "N, Q" are written in step 97, burst data "Q, Q" are written in step 96, and burst data "Q, N" are written in step 95. Next, the forward writing is performed and burst data are written as far as step 95 as shown in the "Forward" column in FIG. 4A. Burst data "Q, Q" are written in step 89, burst data "N, Q" are written in step 90, burst data "N, N" are written in step 91, burst data "Q, N" are written in step 92, burst data "Q, Q" are written in step 93, and burst data "N, Q" are written in step 94. If a burst combination shown in FIG. 3B is written as burst data in the last step 95 (modulo 4=3), i.e., if burst data "N" is written to a cell marked with a cross in step 95 of the "Forward" column in FIG. 4A, burst data in step 96 are "Q, Q", burst data in step 95 are "N, N" and the continuity cannot be maintained. That is, burst data "Q, N" are skipped from the proper repetition of burst data "Q, Q", "Q, N", "N, N" and "N, Q". As a result, the repetition of four combinations of burst data is not realized and the burst data becomes discontinuous, which may lead to failure in tracking. In order to avoid this, a burst combination shown in FIG. 3C is written, i.e., the burst A is not written in the last step 95 of the forward writing. Thus, burst data in step 96 are "Q, Q", burst data in step 95 are "Q, N" and the continuity can be maintained. Finally, a pattern shown in the "2DIR" column in FIG. 4A is obtained and the continuity of burst data can be maintained.

The case where the step number of the last step of the forward writing is an even number is described with reference to FIG. 4B. First, the reverse writing is performed and burst data are written as far as step 94 as shown in the "Reverse" column in FIG. 4B. Burst data "Q, Q" are written in step 100, burst data "Q, N" are written in step 99, burst data "N, N" are written in step 98, burst data "N, Q" are written in step 97, burst data "Q, Q" are written in step 96, burst data "Q, N" are written in step 95, and burst data "N, N" are written in step 94. Next, the forward writing is performed and burst data are written as far as step 94 as shown in the "Forward" column in FIG. 4B. Burst data "Q, Q" are written in step 89, burst data "N, Q" are written in step 90, burst data "N, N" are written in step 91, burst data "Q, N" are written in step 92 and burst data "Q, Q" are written in step 93. If a burst combination shown in FIG. 3B is written as burst data in the last step 94 (step modulo 4=2), i.e., if burst data "Q" are written to a cell marked with a cross in step 94 of the "Forward" column in FIG. 4B, burst data in step 95 are "Q, N", burst data in step 94 are "N, Q" and the continuity cannot be maintained. That is, burst data "N, N" are skipped from the proper repetition of burst data "Q, Q", "Q, N", "N, N" and "N, Q". As a result, the repetition of four combinations of burst data is not realized and the burst data become discontinuous, which may lead to failure in tracking. In order to avoid this, a burst combination shown in FIG. 3C is written, i.e., the burst B is not written in the last step 94 of the forward writing. Thus, burst data in step 95 is "Q, N", burst data in step 94 is "N, N" and the continuity can be maintained. Finally, a pattern shown in the "2DIR" column in FIG. 4B is obtained and the continuity of burst data can be maintained.

If address "46" is written in the last step 94 of the forward writing, the width of address "46" would be three and a half times the track width and addresses become discontinuous. To avoid this issue, no address is written in the last step 94 of the forward writing.

FIG. 5 is a flowchart of servo writing according to the first embodiment. It is assumed that a spiral pattern is formed on a disk of the present embodiment and a method of writing servo data by a hard disk drive based on the spiral pattern is employed.

In S102, the main controller 26 positions the write head 16A at a particular position on the innermost track of the disk 12. For example, the main controller 26 positions the write head 16A on a seed pattern of the innermost track of the disk 12. The seed pattern is an auxiliary servo pattern formed on a part of the disk 12 together with the spiral pattern.

In S104, the main controller 26 controls the SPM 14 and the VCM 20 through the driver IC 22 and writes servo data to each servo area by the reverse writing using the write head 16A. Of the servo data, Gray codes and burst data are shown in FIG. 4A (in the case where a switching step between the reverse writing and the forward writing is an odd-numbered step) and FIG. 4B (in the case where the switching step is an even-numbered step).

In S108, the main controller 26 determines whether the servo data has been written to the switching step between the reverse writing and the forward writing. In the case of NO in S108, the reverse writing of S104 is continued. In the case of YES in S108, the main controller 26 positions the write head 16A at a particular position on the outermost track of the disk 12 in S122.

In S124, the main controller 26 controls the SPM 14 and the VCM 20 through the driver IC 22 and writes servo data to each servo area by the forward writing using the write head 16A. Of the servo data, Gray codes and burst data are shown in FIG. 4A (in the case where the switching step is an odd-numbered step) and FIG. 4B (in the case where the switching step is an even-numbered step).

In S128, the main controller 26 determines whether the servo data are written to the switching step (step 95 in FIG. 4A, step 94 in FIG. 4B). In the case of NO in S128, the forward writing of S124 is continued. In the case of YES in S128, the main controller 26 determines whether the switching step is an odd-numbered step in S132. If the switching step is an odd-numbered step (Yes in S132), the main controller 26 writes a Gray code to the address area and burst data to the burst area B without writing burst data to the burst area A in accordance with FIG. 3C in S134. If modulo 4 of the step number is 3, the first burst data "N" are written to the burst area B. If modulo 4 of the step number is 1, the second burst data "Q" are written to burst area B. In the case of NO in S132, the main controller 26 writes burst data to the burst area A without writing a Gray code to the address area and writing burst data to the burst area B in accordance with FIG. 3C in S136. If modulo 4 of the step number is 2, the first burst data "N" are written to the burst area A. If modulo 4 of the step number is 0, the second burst data "Q" are written to the burst area A.

As described above, according to the first embodiment, the bidirectional writing is performed by overwriting a part of data previously written while moving the head 16 toward the innermost or outermost track with new data. In the bidirectional writing, an address of each step is changed between the forward writing and the reverse writing, i.e., a writing position of the same address is displaced to the inner diameter side in the forward writing, as shown in FIG. 2D.

In addition, a part of the address and the burst data of the last step of the bidirectional writing is not written according to whether the switching step is an odd-numbered step or an even-numbered step as shown in FIG. 4A and FIG. 4B. As a result, discontinuity of servo data caused by disparity of yaw angle can be reduced and the continuity of address and burst data can be maintained in the border between the address and burst data written by the reverse writing and the address and burst data written by the forward writing.

Other embodiments are hereinafter described. In the other embodiments, the same portions as the first embodiment are represented by the same reference numbers and their detailed descriptions are omitted. The other embodiments are related to partial modifications of the first embodiment. The other embodiments can be combined with the first embodiment. In addition, the other embodiments can be combined with each other.

Second Embodiment

A block diagram of a hard disk drive according to a second embodiment is omitted since the configuration thereof is the same as that according to the first embodiment.

Figure 6A:
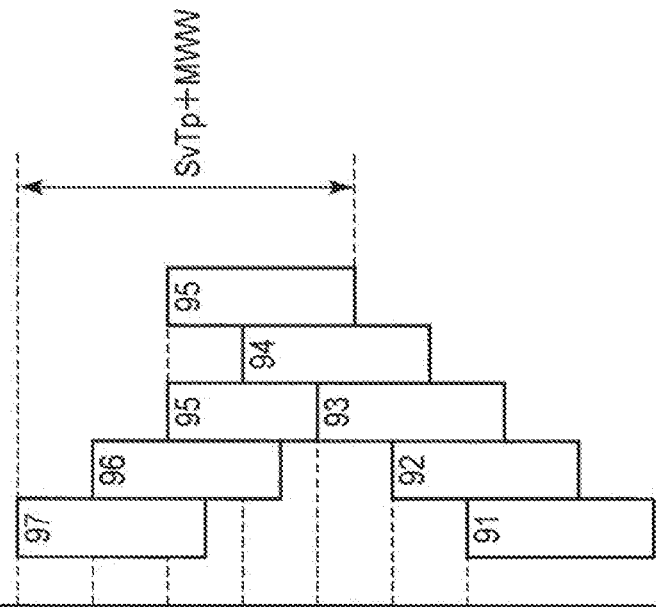
FIG. 6A shows a pitch error in servo tracks in the last step of forward writing.

If the same addresses (obtained by discarding the fractional part of step/2) are written by the reverse writing and the forward writing, the width of an address written in the last step of the forward writing, which is not overwritten with another address, is greater than the other address width as shown in FIG. 2C. In order to avoid this issue, an address obtained by discarding the fractional part of (step−1)/2 is written in the forward writing in the first embodiment. As a result, as shown in FIG. 6A, address positions are displaced to the inside by one step and the address written in the last step of the forward writing has a width equal to a write head width MWW which is substantially equal to the other address width.

However, the write head width MWW is two and a half times the step width and thus is not completely equal to the other address width, i.e., the track width SvTp which is twice the step width. Therefore, there is a pitch error of MWW−SvTp between two tracks 48 and 47 around the last step 95 of the forward writing. This error would not be so large as to negatively affect the servo control and should not cause any problem. However, the hard disk drive according to second embodiment is directed to further reducing the error.

Figure 6B:
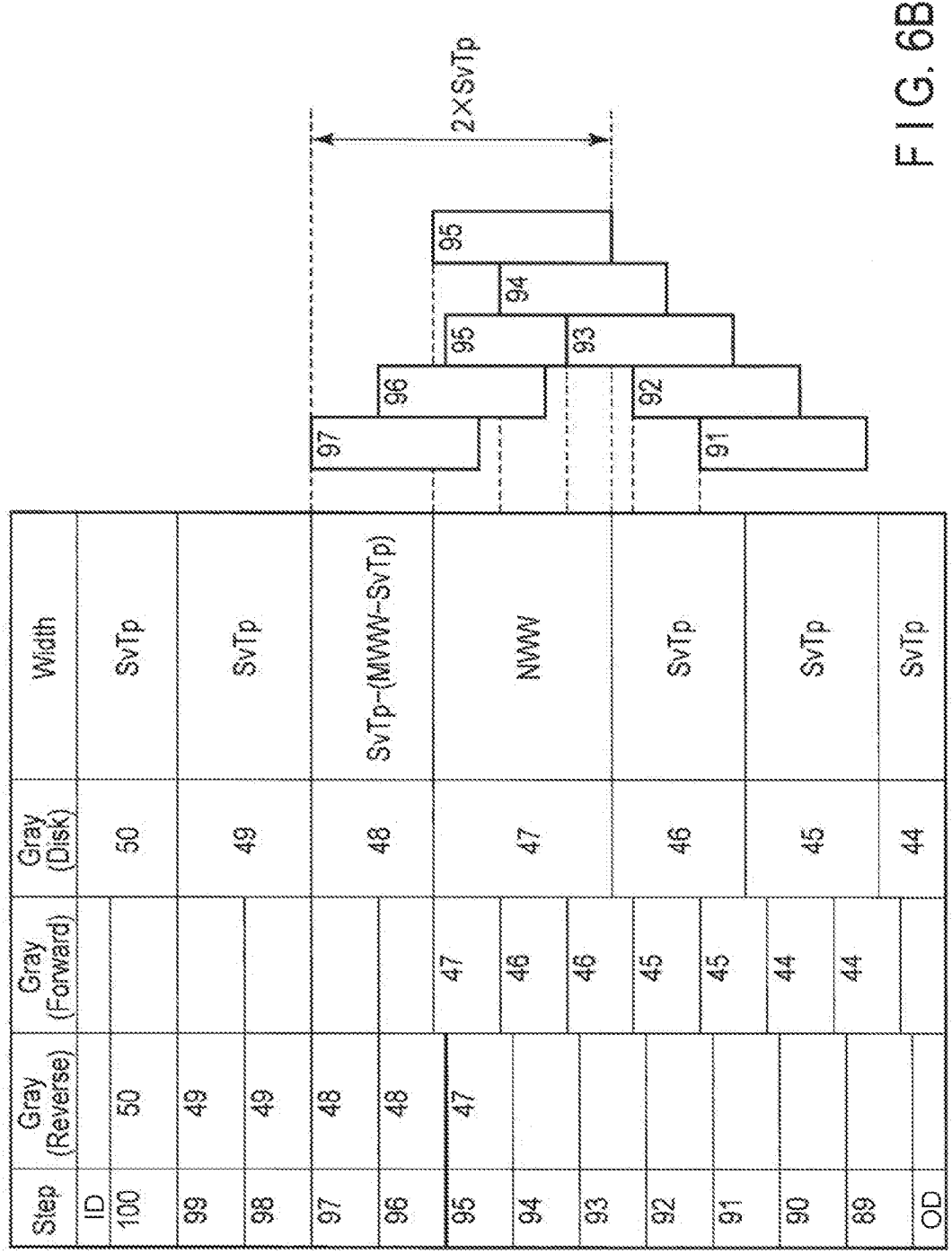
FIG. 6B shows pitch error correction of servo tracks in the last step of forward writing in a second embodiment.

In the second embodiment, as shown in FIG. 6B, writing positions of addresses in the case of the forward writing are further displaced to the inside by the magnitude of the error (=MWW−SvTp) in comparison with the first embodiment. Also, the track width of the last track 48 of the reverse writing area is narrowed, and the total track width of two tracks 48 and 47 around the last step 95 of forward writing is 2×SvTp. The total track width of two tracks 48 and 49 around the last step 95 is SvTp+MWW in the first embodiment as shown in FIG. 6A, but is 2×SvTp in the second embodiment. Therefore, the average pitch of the two tracks can be SvTp, which is equal to the pitch of the other tracks. If the head width MWW can be accurately measured, the pitch error between the reverse writing area and the forward writing area can be zero.

In addition, according to the second embodiment, in a hard disk drive equipped with a plurality of heads, a step response can be prevented when moving the heads on a track in accordance with a virtual circle control, in which the paths of the heads are controlled in perfect circles with respect to the rotation center of disks, in order to eliminate a difference in eccentricity between the heads. A difference in eccentricity between the heads causes position and speed errors at the time of head change seek. This results in increased seek time and degradation of seek performance.

The head width MWW may be measured for each head by a well-known measuring method, or in the alternative a preliminarily measured nominal value may be used.

Third Embodiment

Figure 7:
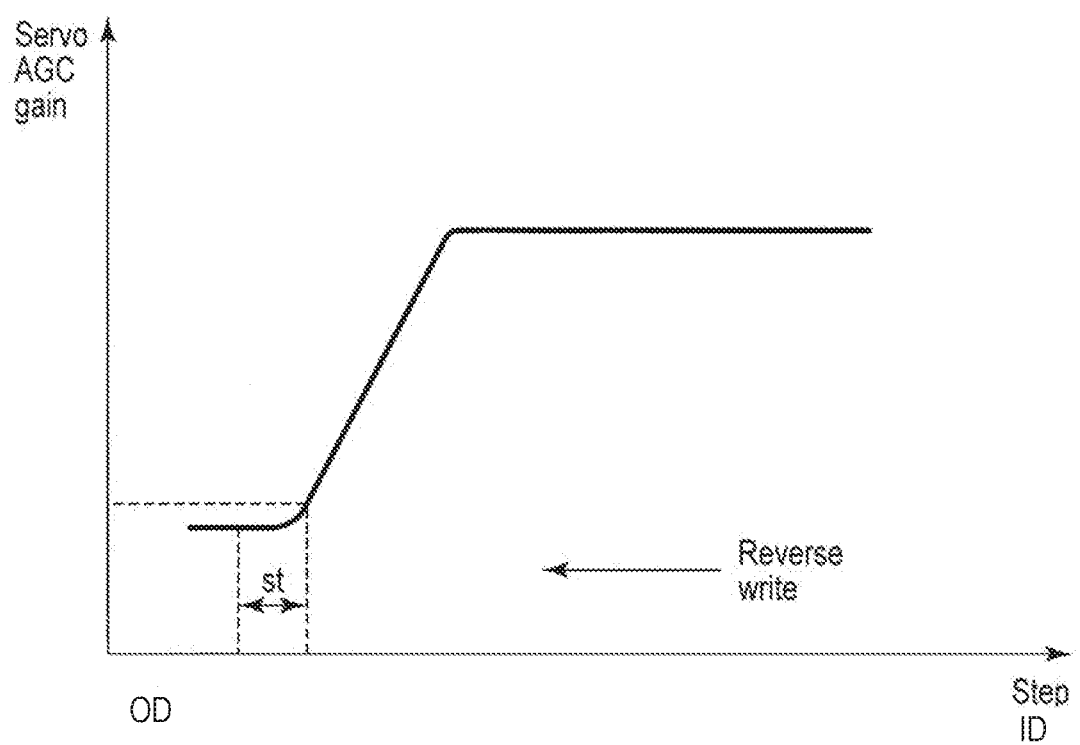
FIG. 7 shows a detection principle of the last step of reverse writing in a third embodiment.

In the first and second embodiments, the reverse writing and the forward writing are switched in a particular radial position (step). In contrast, in the third embodiment, a switching step is automatically determined during the reverse writing based on a principle shown in FIG. 7. In FIG. 7, the horizontal axis indicates a radial position (the left is the inner diameter area and the right is the outer diameter area), and the vertical axis indicates a gain of a servo AGC circuit provided in the read/write channel 30. The servo AGC circuit is a variable amplifier configured to amplify a reproduction signal to stabilize the amplitude of the reproduction signal when reproducing servo data. In the third embodiment, servo data written by the write head 16A are read by the read head 16B. When the write head 16A is located on the innermost track, the read head 16B is located on the tracks outer than the write head 16A and thus cannot read the servo data. Therefore, the gain of the servo AGC circuit is kept high. If the yaw angle approximates zero and a distance (interval in the radial direction) between the write head 16A and the read head 16B becomes less than or equal to a particular distance as the reverse writing proceeds, the read head 16B can partially read the servo data written by the write head 16A. Therefore, the gain of the servo AGC circuit gradually decreases. If the yaw angle reaches zero as the reverse writing further proceeds, the read head 16B can completely read the servo data. If the gain of the servo AGC circuit is constant for particular steps st, the yaw angle is determined to be zero.

Figure 8:
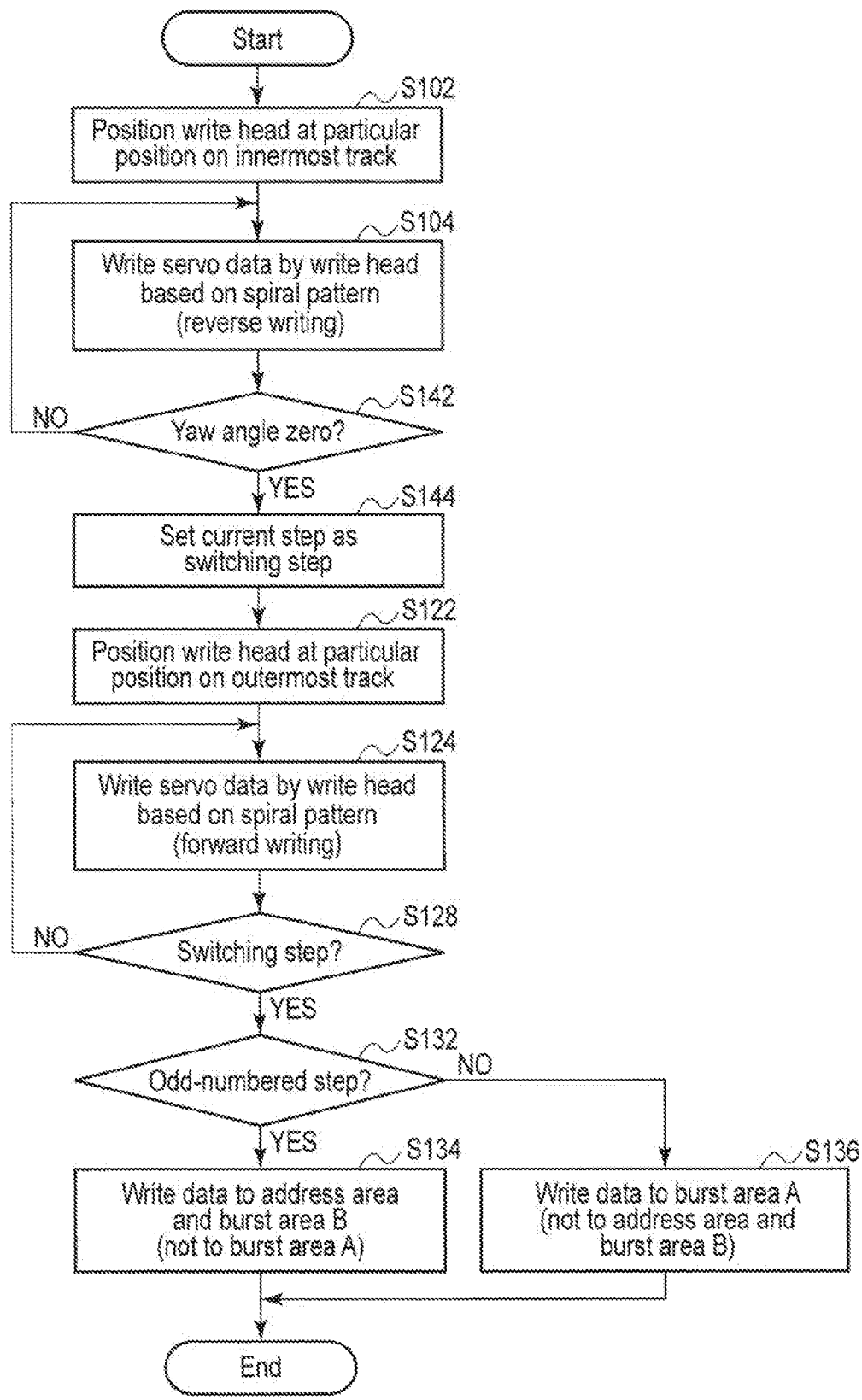
FIG. 8 is a flowchart showing servo data writing according to the third embodiment.

FIG. 8 is a flowchart showing servo writing according to the third embodiment. The same processing blocks as the first embodiment shown in FIG. 5 are represented by the same reference numbers and their descriptions are omitted. The main controller 26 performs the reverse writing of servo data in S104. In S142, the main controller 26 reads the servo data and determines whether the yaw angle has become zero based on the gain of the servo AGC circuit of the read/write channel 30. The reverse writing in S104 is repeated until the yaw angle becomes zero. If the yaw angle becomes zero, the current step is stored in the RAM 34B as a switching step in S144. The following process is the same as the first embodiment shown in FIG. 5.

According to the third embodiment, the switching step is determined based on the reproduction signal of the head 16. Therefore, the reverse writing and the forward writing can be appropriately switched in bidirectional writing, and discontinuity of servo data caused by disparity of yaw angles can be prevented even if the eccentricity differs among a plurality of head in a hard disk drive.

Fourth Embodiment

In the above embodiments, servo data are written to a disk on which a spiral pattern has been formed by an external device without consideration of eccentricity of the disk 12. In reality, however, the spiral pattern formed by the external device may have an eccentric component and the disk 12 may not be a perfect circle. Because of the structure of the spiral pattern, it is difficult to perform virtual circle control, i.e., remove eccentricity while tracking the spiral pattern.

If there is eccentricity, tracks are included in a switching area of the reverse writing and the forward writing when the drive performs virtual circle control. If the bidirectional writing of the servo data is performed, continuity of track pitch is slightly impaired in the switching area of the reverse writing and the forward writing. Therefore, data cannot be written to the switching area to which such servo data are written. If the virtual circle control is not performed, however, the impact of the discontinuity of track pitch is small since the switching area includes only one track. If the virtual circle control is performed, the impact of the discontinuity of track pitch is large since the switching area includes a plurality of tracks. Since a switching area including a plurality of tracks is not desirable for servo control, the number of tracks included in the switching area should preferably be reduced to a minimum.

According to the fourth embodiment, the number of tracks in the switching area is prevented from increasing in the virtual circle control by writing servo data to the switching area in accordance with an eccentric component. One step is defined as a switching step in the first to third embodiments, but switching steps are defined according to the eccentricity in the fourth embodiment. For example, if the eccentricity is 10 µm and servo track pitch is 10 nm, 2000 switching steps (corresponding to 1000 tracks) are defined. Servo data are written to all servo sectors in one circuit of the disk in the first to third embodiments, but written to only a part of the servo sectors in the fourth embodiment.

Figures 9, 10:
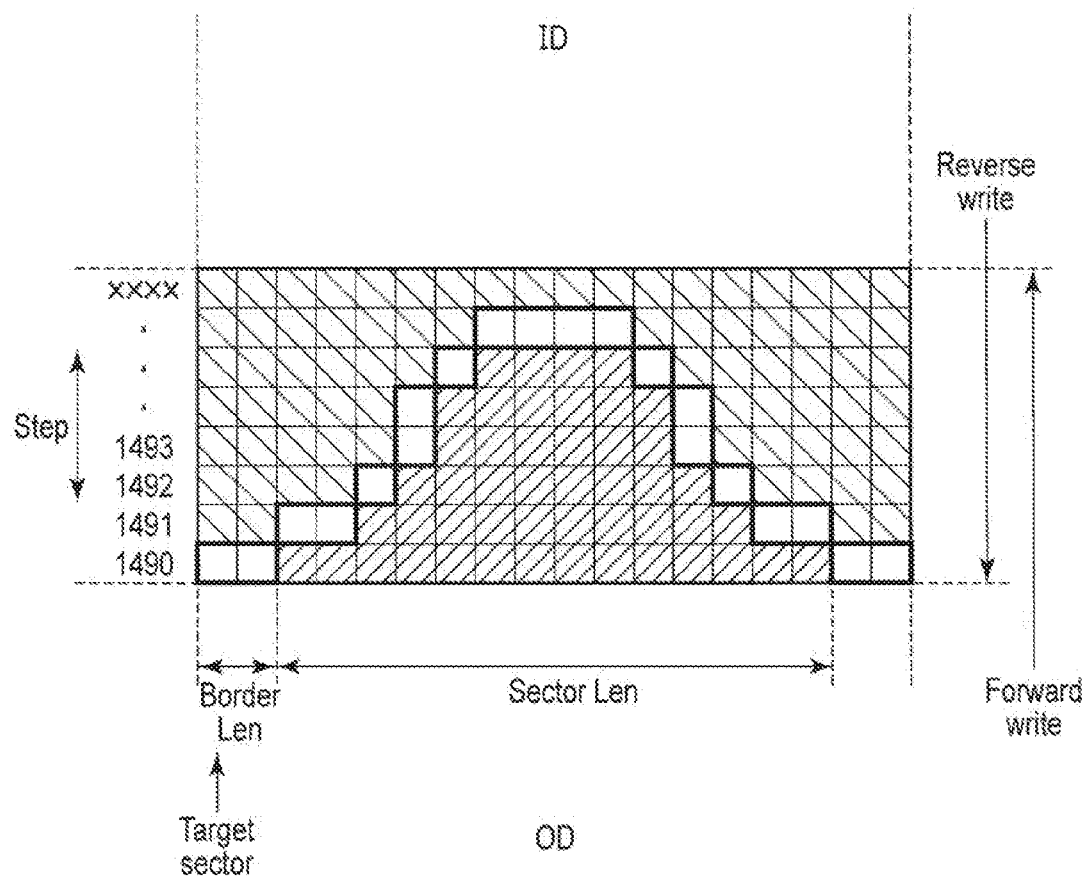
FIG. 9 shows an overview of eccentricity correction according to a fourth embodiment.
FIG. 10 shows an example of a sector table used for the eccentricity correction.

FIG. 9 shows writing patterns of burst data in switching steps. In FIG. 9, "border len" is the number of sectors in which data are written using the border pattern (pattern with the modified burst sequence) between the forward and reverse write regions, and "sector len" is the number of sectors in which data are written using normal wedges. Since there is eccentricity, switching steps include steps 1490 (OD side) to xxxx (ID side). An area hatched from top left to bottom right indicates a pattern of the reverse writing, an area hatched from top right to bottom left indicates a pattern of the forward writing, and a blank area indicates a border pattern. For example, the pattern of the reverse writing and the pattern of the forward writing are patterns shown in FIG. 4A and FIG. 4B, and the border pattern is a pattern in step 95 in FIG. 4A or step 94 in FIG. 4B. The writing pattern differs for each sector depending on the eccentricity. For example, in step 1490, the first two sectors are the border pattern, followed by fourteen sectors of the forward pattern and two sectors of the border pattern. In step 1491, the first two sectors are the reverse pattern, followed by two sectors of the border pattern, ten sectors of the forward pattern, two sectors of the border pattern, and two sectors of the reverse pattern. In this manner, the border pattern according to the eccentricity can be written and servo data unaffected by the eccentricity of the spiral pattern can be written.

FIG. 10 is a sector table for writing the patterns shown in FIG. 9. In FIG. 10, s1, s2 . . . are the target sectors to start the pattern write at each track step, b1, b2 . . . are border len values for each track step (number of sectors in which data are written using the border pattern), and L1, L2 . . . are sector len values for each track step (number of sectors in which data are written using the normal pattern). As shown in FIG. 9, the reverse pattern is written from the innermost track to an outermost switching step 1490 by the reverse writing. After that, the reverse writing is switched to the forward writing, and the forward pattern is written from the outermost track to a step (step 1489) (not shown) preceding the outermost switching step 1490. Then, as shown in FIG. 10, the border pattern or the forward pattern is written to each sector from the outermost switching step 1490 to an innermost switching step xxxx.

In the sector table, a target sector, a border length, and a sector length are defined for each target step. The target sector is a sector number from which writing of the border pattern is started, the border length is a length (number of sectors) of the border pattern, and the sector length is a length (number of sectors) of the forward pattern. The target sector depends on a phase component of the eccentricity.

A method of creating the table shown in FIG. 10 is described below.

The servo sector number is SECTNUM. The head 16 moves toward the innermost track, the seed pattern is demodulated, for example, while the head 16 is pushed against a stopper, and a maximum Gray code of address GRAYmax, a minimum Gray code of address GRAYmin, and servo sectors SECTmax and SECTmin in which these code values are read are recorded.

A row number N of the table of FIG. 10 is calculated as follows:

$N=(GRAYmax-GRAYmin)\times 2+1$

The "Target step" column of the table of FIG. 10 is calculated as an N array STEP [N] as follows:

STEP [0]=a nominal position of the last step of the forward area (1490 in the case of FIG. 10)

STEP [1]=STEP [0]+1

STEP [2]=STEP [0]+2

STEP [n−1]=STEP [0]+(GRAYmax−GRAYmin)×2

The "Target sector", "Border Len" and "Sector Len" columns in the table of FIG. 10 are calculated as an N array TARGET [N], an N array BORDER [N], and an N array SCTLEN [N] as follows:

It is assumed that variable i=1, variable step=0, variable s=SECTmax, TARGET [step]=s and BORDER [step]=1.

(1) Calculate variable b=ROUND ((−cos(i×2×n/SECTNUM)+1)×(GRAYmax−GRAYmin))

(2) If b="step", increase BORDER [step] by 1 and calculate SCTLEN [step] as follows:

SCTLEN [step]=max(SECTNUM−(BORDER [step]+i)× 2, 0)

(3) If b≠"step", repeat the following while b>"step":

(3-1) Increase "step" by 1

(3-2) TARGET [step]=s (3-3) BORDER [step]=0

(3-4) SCTLEN [step]=max(SECTNUM−(BORDER [step]+i)×2, 0)

If b="step", (3-5) TARGET [step]=s (3-6) BORDER [step]=1

(3-7) SCTLEN [step]=max(SECTNUM−(BORDER [step]+i)×2, 0)

(4) s=(s+1) mod SECTNUM (5) Increase i by 1

(6) If i<SECTNUM/2, return to (1)

In the above calculation, max( ) is a function which returns the maximum of two arguments, and cos( ) is a function which returns the cosine of an angle in radians.

In the above manner, a table having parameters for changing border tracks of the forward writing and the reverse writing for each sector according to the eccentricity as shown in FIG. 10 can be created. At the time of the pattern writing, if the step number reaches STEP [x], a border pattern is written to BORDER [x] sectors from the TARGET [x] sector, a normal pattern is written to SCTLEN [x] sectors, and then a border pattern is written to BORDER [x] sectors based on the table data.

That is, in each step, writing of the border pattern is started from a target sector, the border pattern of the border length is written, and then the forward pattern of the sector length and the border pattern of the border length are written. The reverse pattern has been already written by the reverse writing to the remaining sectors. To what step the border pattern is written is determined according to an amplitude component of eccentricity. In this manner, the border pattern according to the eccentricity as shown in FIG. 9 can be written, and thus servo data unaffected by the eccentricity of the spiral pattern can be written.

FIG. 11 is a flowchart showing servo writing of the fourth embodiment.

After the write head 16A is positioned on the seed pattern of the innermost track in S102, the main controller 26 measures the eccentricity in S150. The eccentricity can be measured by using servo data of the seed pattern of the innermost track, gate timing of the spiral pattern of the innermost track, etc. The sector table of FIG. 10 is created based on the phase and amplitude of the eccentric component. The sector table is stored in the RAM 34B.

Then, the reverse writing is performed in S104 in the same way as the first embodiment.

In S152, the main controller 26 determines whether the servo data have been written to an outermost switching step (step 1490 in FIG. 9). In the case of NO in S152, the reverse writing of S104 is continued. In the case of YES in S152, the write head 16A is moved to the outermost track in S122 and the forward writing is performed in S124.

In S154, the main controller 26 determines whether the servo data have been written to a step (step 1489) preceding the outermost switching step 1490. In the case of NO in S154, the forward writing of S124 is continued. In the case of YES in S154, the main controller 26 reads the sector table, writes a border pattern of a border length from a target sector, and then writes a forward pattern of a sector length and the border pattern of the border length in S156.

In S158, the main controller 26 determines whether the servo data have been written to an innermost switching step (step xxxx in FIG. 9). In the case of NO in S158, writing according to the sector table of S156 is continued. In the case of YES in S158, the process ends.

In this manner, the reverse pattern written by the reverse writing is partially overwritten with the border pattern and the forward pattern in accordance with the eccentricity as shown in FIG. 9. The border tracks can be a perfect circle. Therefore, the virtual circle control can be performed without issues caused by the eccentricity of the disk 12.

Fifth Embodiment

An example of a manufacturing method of the hard disk drive according to the above-described embodiments is shown in FIG. 12. In 5202, main components such as a disk and a head are assembled into a hard disk drive. In 5204, the main controller 26 writes servo data to each servo track of servo areas as in the first to fourth embodiments. In S206, test data are written to a data track and whether the test data can be read correctly is checked. A device with a good check result is shipped out.

A single disk and a single head are assumed in the above embodiments, but several recording surfaces and heads may be provided. If two recording surfaces are provided, two disks are not necessarily provided and the recording surfaces may be provided on both sides of a single disk.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hard disk drive, comprising:
   a disk including a servo region extending in a radial direction of the disk; and
   a head including a read element and a write element capable of writing servo data in the servo region, the read element and the write element being arranged at different positions in a direction parallel to a length of the head, wherein
   consecutive values indicating addresses in the radial direction and periodical patterns of a pair of two-phase burst data are written in a plurality of servo tracks of the servo region, throughout the servo region in the radial direction, without logical irregularity of the values and the patterns,
   the read element is capable of reading the value and the pair of two-phase burst data in each of the servo tracks, and
   one of the servo tracks located between an innermost servo track and an outermost servo track has a wider width in the radial direction than a width of other servo tracks.

2. The hard disk drive according to claim 1, further comprising:
   a controller configured to cause the write element to carry out a servo writing operation of:
      writing the servo data as the head moves outward on the disk towards a radial position thereof one step at a time, so as to overwrite a part of the servo data that have been written in a previous step, wherein the same address data are written as the head moves outward in two consecutive steps;
      writing the servo data as the head moves inward on the disk towards the radial position one step at a time, so as to overwrite a part of the servo data that have been written in a previous step, wherein the same address data are written as the head moves inward in two consecutive steps; and
      writing either one of two-phase burst data, or address data and the other of said two-phase burst data, at the radial position, so as to overwrite (i) at least a part of the servo data written in a last step of the writing as the head moves outward or (ii) at least a part of the servo data written in a last step of the writing as the head moves inward.

3. The hard disk drive according to claim 2, wherein
   when a number of writing steps outside the radial position is an even number, said one of two-phase burst data are written at the radial position, and
   when the number is an odd number, said address data and the other of said two-phase burst data are written at the radial position.

4. The hard disk drive according to claim 2, wherein
   the writing as the head moves inward is carried out after the writing as the head moves outward.

5. The hard disk drive according to claim 2, wherein
   the writing as the head moves outward is carried out after the writing as the head moves inward.

6. The hard disk drive according to claim 2, wherein
   the servo data written during the writing as the head moves inward or outward are shifted by one step inward.

7. The hard disk drive according to claim 2, wherein
   the read element is positioned at a position closer to a rotational center of an arm to which the head is attached than the write element, and
   an angle made by a line which is parallel to a tangent of the disk and a line passing through centers of the write element and the read element in a width direction of the head is zero when the head is located at the radial position.

8. The hard disk drive according to claim 7, wherein
   the controller is further configured to determine whether or not the angle becomes zero during one of the writing the servo data as the head moves outward and the writing the servo data as the head moves inward, that is carried out first, and
   when the angle is determined to be zero, then the controller carries out the other one of the writing the servo data as the head moves outward and the writing the servo data as the head moves inward.

9. The hard disk drive according to claim 8, wherein
   whether the angle becomes zero is determined based on a gain of an auto gain control circuit that adjusts an intensity of a read signal from the read element.

10. The hard disk drive according to claim 2, wherein
    the controller is further configured to determine the radial position based on an eccentricity of the disk.

* * * * *